(12) United States Patent  (10) Patent No.: US 8,031,798 B2
Prasad et al.  (45) Date of Patent: Oct. 4, 2011

(54) GROUP MMSE-DFD WITH RATE (SINR) FEEDBACK AND PRE-DETERMINED DECODING ORDER FOR RECEPTION ON A CELLULAR DOWNLINK

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 666 days.

(21) Appl. No.: 12/047,544

(22) Filed: Mar. 13, 2008

(65) Prior Publication Data

US 2008/0225979 A1  Sep. 18, 2008

Related U.S. Application Data

(60) Provisional application No. 60/894,555, filed on Mar. 13, 2007.

(51) Int. Cl.
*H04B 15/00* (2006.01)
(52) U.S. Cl. ........................ 375/285; 375/259
(58) Field of Classification Search .................. 375/285, 375/259
See application file for complete search history.

(56) References Cited

U.S. PATENT DOCUMENTS 7,254,192 B2 * 8/2007 Onggosanusi et al. ....... 375/340
2008/0212539 A1 * 9/2008 Bottomley et al. ........... 370/335

* cited by examiner

*Primary Examiner* — Shuwang Liu
*Assistant Examiner* — Michael Neff
(74) *Attorney, Agent, or Firm* — Joseph Kolodka

(57) ABSTRACT

A method for decoding and rate assignment in a wireless channel, where all dominant transmitter sources use inner codes from a particular set, comprising the steps of: i) estimating channel matrices seen from all dominant transmitter sources in response to a pilot or preamble signal transmitted by each such source; ii) converting each estimated channel matrix into an effective channel matrix responsive to the inner code of the corresponding transmitter source; iii) obtaining the received observations in a linear equivalent form (linear model) whose output is an equivalent of the received observations and in which the effective channel matrix corresponding to each dominant transmitter source inherits the structure of its inner code; iv) processing the transmitter sources according to the specified (or pre-determined) order of decoding; v) for each transmitter source, assuming perfect cancellation of signals of preceding transmitter sources; vi) computing a signal-to-interference-noise-ratio SINR responsive to the effective channel matrix of the transmitter source and the covariance matrix of the noise plus signals from remaining transmitter sources; and vii) feeding back all computed SINRs to respective transmitter sources.

10 Claims, 2 Drawing Sheets

Destination receiving
signals from multiple sources

Fig 1: Destination receiving signals from multiple sources

GROUP MMSE-DFD WITH RATE (SINR) FEEDBACK AND PRE-DETERMINED DECODING ORDER FOR RECEPTION ON A CELLULAR DOWNLINK

This application claims the benefit of U.S. Provisional Application No. 60/894,555, entitled "Analysis of Multiuser Stacked Space-Time Orthogonal and Quasi-Orthogonal Designs", filed on Mar. 13, 2007, is related to U.S. patent application Ser. No. 12/047,514, entitled "GROUP LMMSE DEMODULATION USING NOISE AND INTERFERENCE COVARIANCE MATRIX FOR RECEPTION ON A CELLULAR DOWNLINK", filed Mar. 13, 2008; is related to U.S. patent application Ser. No. 12/047,527, entitled "GROUP MMSE-DFD WITH ORDER AND FILTER COMPUTATION FOR RECEPTION ON A CELLULAR DOWNLINK", filed Mar. 13, 2008; and related to U.S. patent application Ser. No. 12/047,555, entitled "GROUP MMSE-DFD WITH RATE (SINR) FEEDBACK AND WITHOUT PRE-DETERMINED DECODING ORDER FOR RECEPTION ON A CELLULAR DOWNLINK", filed Mar. 13, 2008; all of which their contents are incorporated by reference herein.

BACKGROUND OF THE INVENTION

The present invention relates generally to wireless communications and, more particularly, to group minimum mean-squared error decision-feedback-decoding (MMSE-DFD) with rate (SINR) feedback and predetermined decoding order for reception on a cellular network.

A wireless cellular system consists of several base-stations or access points, each providing signal coverage to a small area known as a cell. Each base-station controls multiple users and allocates resources using multiple access methods such as OFDMA, TDMA, CDMA, etc., which ensure that the mutual interference between users within a cell (a.k.a. intra-cell users) is avoided. On the other hand co-channel interference caused by out-of-cell transmissions remains a major impairment. Traditionally cellular wireless networks have dealt with inter-cell interference by locating co-channel base-stations as far apart as possible via static frequency reuse planning at the price of lowering spectral efficiency. More sophisticated frequency planning techniques include the fractional frequency reuse scheme, where for the cell interior a universal reuse is employed, but for the cell-edge the reuse factor is greater than one. Future network evolutions are envisioned to have smaller cells and employ a universal (or an aggressive) frequency reuse. Therefore, some sort of proactive inter-cell interference mitigation is required, especially for edge users. Recently, it has been shown that system performance can be improved by employing advanced multi-user detection (MUD) for interference cancellation or suppression. However, in the downlink channel which is expected to be the bottleneck in future cellular systems, only limited signal processing capabilities are present at the mobiles which puts a hard constraint on the permissible complexity of such MUD techniques.

In the downlink, transmit diversity techniques are employed to protect the transmitted information against fades in the propagation environment. Future cellular systems such as the 3GPP LTE system are poised to deploy base-stations with two or four transmit antennas in addition to legacy single transmit antenna base-stations and cater to mobiles with up to four receive antennas. Consequently, these systems will have multi-antenna base-stations that employ space-only inner codes (such as long-term beam forming) and space-time (or space-frequency) inner codes based on the 2×2 orthogonal design (a.k.a. Alamouti design) and the 4×4 quasi-orthogonal design, respectively. The aforementioned inner codes are leading candidates for downlink transmit diversity in the 3GPP LTE system for data as well as control channels. The system designer must ensure that each user receives the signals transmitted on the control channel with a large enough SINR, in order to guarantee coverage and a uniform user experience irrespective of its position in the cell. Inter-cell interference coupled with stringent complexity limits at the mobile makes these goals significantly harder to achieve, particularly at the cell edge.

The idea of using the structure of the co-channel interference to design filters has been proposed, where a group decorrelator was designed for an uplink channel with two-users, each employing the Alamouti design as an inner code. There has also been derived an improved group decorrelator for a multi-user uplink where each user employs the 4×4 quasi-orthogonal design of rate 1 symbol per channel use. Improved group decorrelators have resulted in higher diversity orders and have also preserved the (quasi-) decoupling property of the constituent (quasi-) orthogonal inner codes.

Accordingly, there is a need for a method of reception on a downlink channel with improved interference suppression and cancellation that exploits the structure or the spatio-temporal correlation present in the co-channel interference.

SUMMARY OF THE INVENTION

In accordance with the invention, a method for decoding and rate assignment in a wireless channel, where all dominant transmitter sources use inner codes from a particular set, comprising the steps of: i) estimating channel matrices seen from all dominant transmitter sources in response to a pilot or preamble signal transmitted by each such source; ii) converting each estimated channel matrix into an effective channel matrix responsive to the inner code of the corresponding transmitter source; iii) obtaining the received observations in a linear equivalent form (linear model) whose output is an equivalent of the received observations and in which the effective channel matrix corresponding to each dominant transmitter source inherits the structure of its inner code; iv) processing the transmitter sources according to the specified (or pre-determined) order of decoding; v) for each transmitter source, assuming perfect cancellation of signals of preceding transmitter sources; vi) computing a signal-to-interference-noise-ratio SINR responsive to the effective channel matrix of the transmitter source and the covariance matrix of the noise plus signals from remaining transmitter sources; and vii) feeding back all computed SINRs to respective transmitter sources.

BRIEF DESCRIPTION OF DRAWINGS

These and other advantages of the invention will be apparent to those of ordinary skill in the art by reference to the following detailed description and the accompanying drawings.

DETAILED DESCRIPTION

1. Introduction

Figure 1:
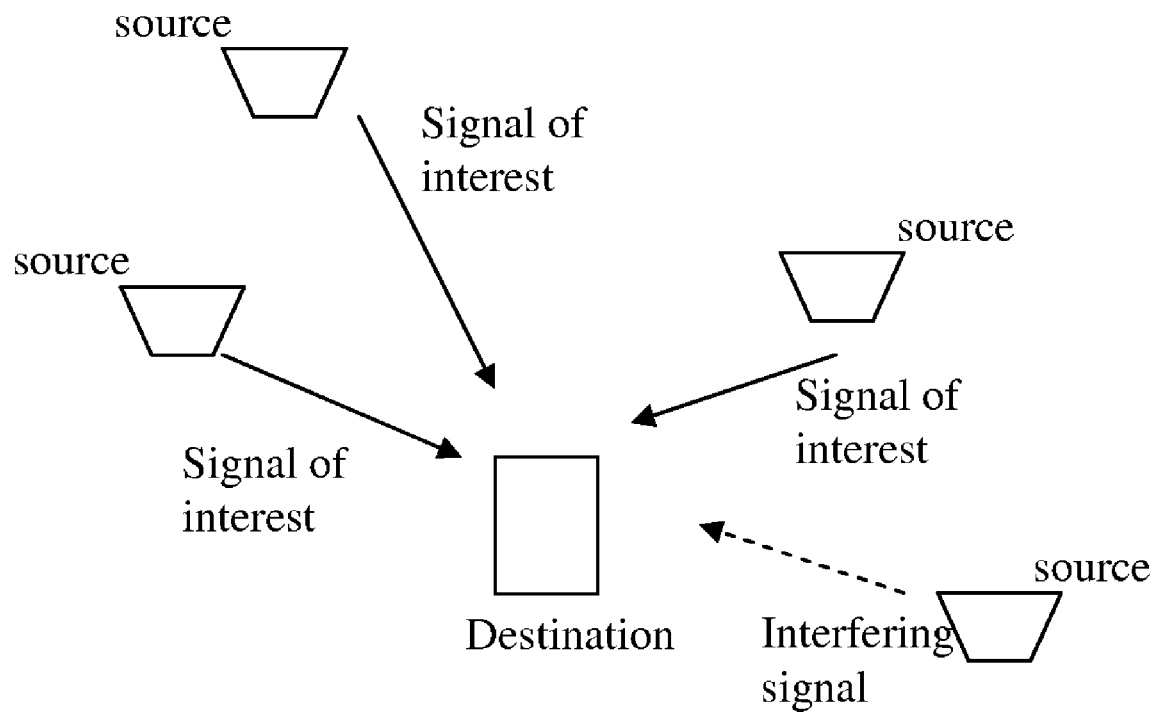
FIG. 1 is a schematic demonstrating a scenario that the invention addresses.

The invention is directed to a wireless system where the user (or destination) receives data from the one or more base-stations and is interfered by other adjacent base-stations. In general, the invention is applicable in a scenario where the user (destination) receives signals simultaneously from multiple sources and is interested in the signal transmitted by some or all of the sources as shown by the diagram of FIG. 1.

The signals transmitted by all sources have structure. In particular the inner codes used by all transmitter sources are from a set of inner codes [(2)-to-(5)]. The inner codes of the each source of interest is known to the destination.

The inventive method resides in the user (destination) receiver design in which we exploit the structure of the co-channel transmitted signals to design filters that yield improved performance (henceforth referred to as improved filters). Moreover, the computational cost of designing these filters can be reduced (Efficient filter design: see Section 4 below) and the demodulation complexity can be kept low, for example see Theorem 1 below for specifics.

More specifically, the inventive method is directed to the situation where the user (destination) receives signals simultaneously from multiple sources and is interested in the signal transmitted by some or all of the sources. The inner codes of all the sources of interest are known to the destination receiver. The inventive method teaches using improved filters, efficient design of the improved filters and using the decoupling property for SINR computation. Using improved filters results in higher rates from all sources of interest compared to those obtained with conventional filters. Key aspect of the invention in addition to using improved filters is: how to assign rates for the transmitter sources of interest.

Figure 2:
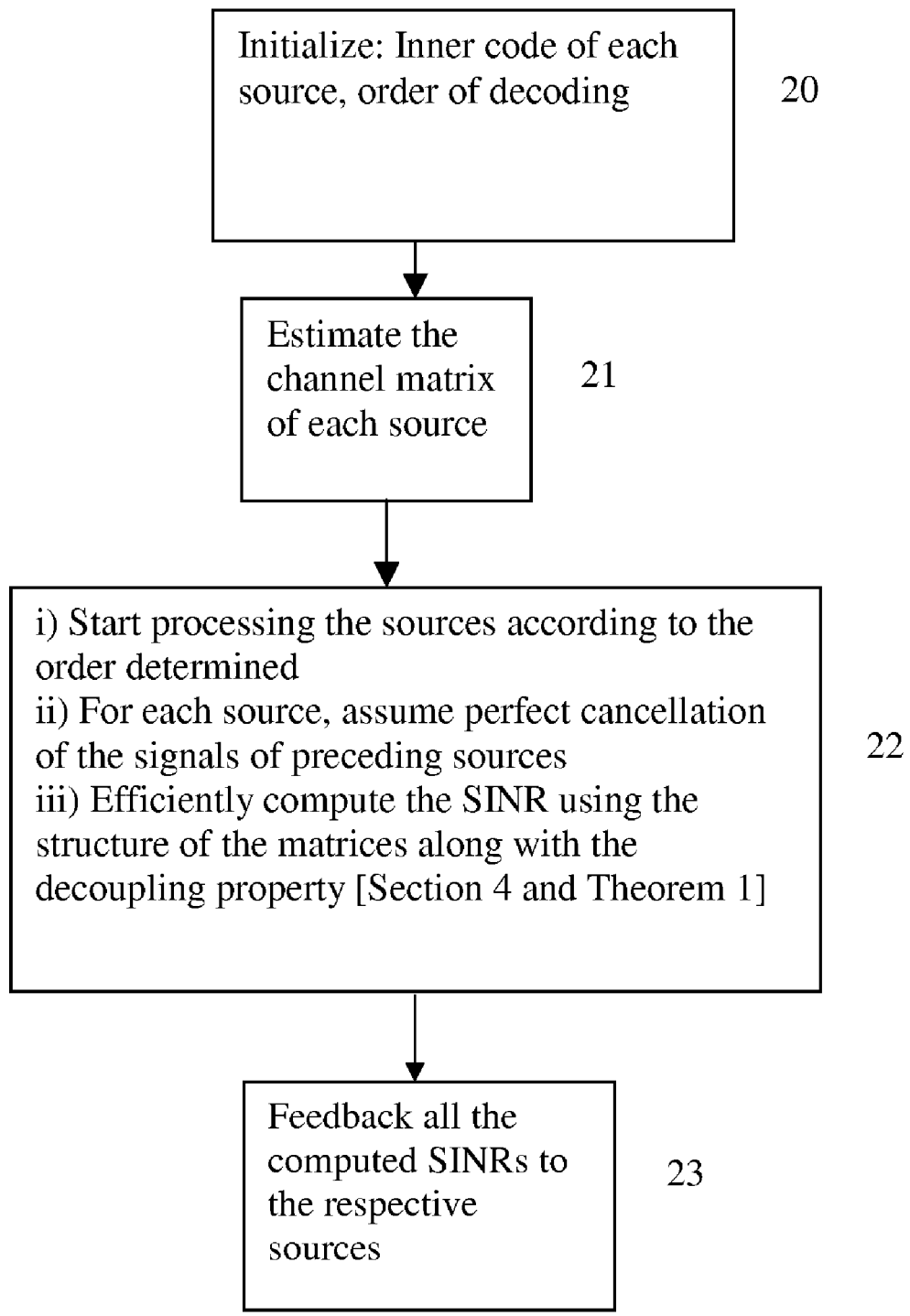
FIG. 2 is a receiver flow diagram for the case when there is a feedback link (channel) between the destination receiver and each transmitter source, in accordance with the invention.

The process steps in accordance with the invention are shown in FIG. 2. The schematic of FIG. 2 is flow diagram for the case when there is a feedback link (channel) between the destination receiver and each transmitter source of interest. The destination receiver determines a rate (or equivalently an SINR) for each transmitter source using a pre-determined order and feeds that back to the respective transmitter source, which will then transmit data at that rate.

Referring now to FIG. 2, the receiver is intialized 20 with an inner code for each transmitter source and the order for decoding the transmitter source signals. In response to a pilot or preamble signal sent from each source, an estimation of the channel matrix of each transmitter source is performed 21. In the next step 22, i) the transmitter sources are processed according to the order determined, ii) for each trasmitter source assume perfect cancellation of the signals of preceding transmitter sources, and iii) efficiently compute the signal-to-interference-noise ratios SINRs using the structure of covariance matrices along with the decoupling property (see section 4, theorem 1). Lastly, feedback all the computed SINRs to the respective transmitter sources 23.

2. System Descriptions

2.1. System Model

We consider a downlink fading channel, depicted in FIG. 1, where the signals from K base-stations (BSs) are received by the user of interest. The user is equipped with $N \geq 1$ receive antennas and is served by only one BS but interfered by the remaining K-1 others. The BSs are also equipped with multiple transmit antennas and transmit using any one out of a set of three space-time inner codes. The 4×N channel output received over four consecutive symbol intervals, is given by $$Y = XH + V, \quad (1)$$

where the fading channel is modeled by the matrix H. For simplicity, we assume a synchronous model. In practice this assumption is reasonable at the cell edge and for small cells. Moreover, the model in (1) is also obtained over four consecutive tones in the downlink of a broadband system employing OFDM such as the 3GPP LTE system. We partition H as $H = [H_1^T, \ldots, H_K^T]^T$, where $H_k$ contains the rows of H corresponding to the $k^{th}$ BS. The channel is quasi-static and the matrix H stays constant for 4 symbol periods after which it may jump to an independent value. The random matrix H is not known to the transmitters (BSs) and the additive noise matrix V has i.i.d. $\mathcal{CN}(0, 2\sigma^2)$ elements.

The transmitted matrix X can be partitioned as $= [x_1, \ldots, x_K]$ where $$X_k = \begin{bmatrix} x_{k,1} & x_{k,2} & x_{k,3} & x_{k,4} \\ -x_{k,2}^\dagger & x_{k,1}^\dagger & -x_{k,4}^\dagger & x_{k,3}^\dagger \\ x_{k,3} & x_{k,4} & x_{k,1} & x_{k,2} \\ -x_{k,4}^\dagger & x_{k,3}^\dagger & -x_{k,2}^\dagger & x_{k,1}^\dagger \end{bmatrix}, \quad (2)$$

when the $k^{th}$ BS employs the quasi orthogonal design as its inner code and $$X_k = \begin{bmatrix} x_{k,1} & x_{k,2} \\ -x_{k,2}^\dagger & x_{k,1}^\dagger \\ x_{k,3} & x_{k,4} \\ -x_{k,4}^\dagger & x_{k,3}^\dagger \end{bmatrix}, \quad (3)$$

when the $k^{th}$ BS employs the Alamouti design and finally $$X_k = [x_{k,1} x_{k,2} x_{k,3} x_{k,4}]^T, \quad (4)$$

when the $k^{th}$ BS has only one transmit antenna. The power constraints are taken to be $E\{|x_{k,q}|^2\} \leq 2w_k$, $1 \leq k \leq K, 1 \leq q \leq 4$.

We also let the model in (1) include a BS with multiple transmit antennas which employs beamforming. In this case $$X_k = [x_{k,1} x_{k,2} x_{k,3} x_{k,4}]^T u_k, \quad (5)$$

where $u_k$ is the beamforming vector employed by BS k. Note that $X_k$ in (5) can be seen as a space-only inner code. Also, the beamforming in which vector $u_k$ only depends on the long-term channel information, is referred to as long-term beamforming. We can absorb the vector $u_k$ into the channel matrix $H_k$ and consider BS k to be a BS with a single virtual antenna transmitting (4). Notice that the inner codes in (2)-to-(5) all have a rate of one symbol per-channel-use and we assume that the desired BS employs any one out of these inner codes. Furthermore, we can also accommodate an interfering BS with multiple transmit antennas transmitting in the spatial multiplexing (a.k.a. BLAST) mode as well as an interfering BS with multiple transmit antennas employing a higher rank preceding. In such cases, each physical or virtual transmit antenna of the interfering BS can be regarded as a virtual interfering BS with a single transmit antenna transmitting (4). Then since the codewords transmitted by these virtual BSs are independent they can be separately decoded when the interference cancellation receiver is employed.

Let $Y_n$ and $V_n$ denote the $n^{th}$, $1 \leq n \leq N$, columns of the matrices Y and V with $Y_n^R, Y_n^I$ and $V_n^R, V_n^I$ denoting their real and imaginary parts, respectively. We define the $8N \times 1$ vectors $\tilde{y} \triangleq [(Y_1^R)^T, (Y_1^I)^T, \ldots, (Y_N^R)^T, (Y_N^I)^T]^T$, $\tilde{v} \triangleq [(V_1^R)^T, (V_1^I)^T, \ldots, (V_N^R)^T, (V_N^I)^T]^T$. Then, $\tilde{y}$ can be written as $$\tilde{y} = \tilde{H}\tilde{x} + \tilde{v}, \quad (6)$$

where $\tilde{x} \triangleq [\tilde{x}_1^T, \ldots, \tilde{x}_K^T]^T$ with $\tilde{x} = [x_{k,1}^R, \ldots, x_{k,4}^R, x_{k,1}^I, \ldots, x_{k,4}^I]^T$ and $\tilde{H} = [\tilde{H}_1, \ldots, \tilde{H}_K] = [\tilde{h}_1, \ldots, \tilde{h}_{8K}]$. Further when the $k^{th}$ BS employs either the quasi-orthogonal design or the Alamouti design we can expand $\tilde{H}_k$ as $$\tilde{H}_k = [\tilde{h}_{8k-7}, \ldots, \tilde{h}_{8k}] =$$
$$[(I_N \otimes C_1)\tilde{h}_{8k-7}, (I_N \otimes C_2) \tilde{h}_{8k-7}, \ldots,$$
$$(I_N \otimes C_8) \tilde{h}_{8k-7}], \quad (7)$$

where ⊗ denotes the Kronecker product, $C_1 = I_8$ and $$C_2 = I_2 \otimes \begin{bmatrix} 0 & 1 & 0 & 0 \\ -1 & 0 & 0 & 0 \\ 0 & 0 & 0 & 1 \\ 0 & 0 & -1 & 0 \end{bmatrix} \quad C_3 = I_2 \otimes \begin{bmatrix} 0 & 0 & 1 & 0 \\ 0 & 0 & 0 & 1 \\ 1 & 0 & 0 & 0 \\ 0 & 1 & 0 & 0 \end{bmatrix} \quad C_4 = I_2 \otimes \begin{bmatrix} 0 & 0 & 0 & 1 \\ 0 & 0 & -1 & 0 \\ 0 & 1 & 0 & 0 \\ -1 & 0 & 0 & 0 \end{bmatrix} \quad (8)$$

$$C_5 = J_2 \otimes \begin{bmatrix} 1 & 0 & 0 & 0 \\ 0 & -1 & 0 & 0 \\ 0 & 0 & 1 & 0 \\ 0 & 0 & 0 & -1 \end{bmatrix} \quad C_6 = J_2 \otimes \begin{bmatrix} 0 & 1 & 0 & 0 \\ 1 & 0 & 0 & 0 \\ 0 & 0 & 0 & 1 \\ 0 & 0 & 1 & 0 \end{bmatrix} \quad C_7 = J_2 \otimes \begin{bmatrix} 0 & 0 & 1 & 0 \\ 0 & 0 & 0 & -1 \\ 1 & 0 & 0 & 0 \\ 0 & -1 & 0 & 0 \end{bmatrix}$$

$$C_8 = J_2 \otimes \begin{bmatrix} 0 & 0 & 0 & 1 \\ 0 & 0 & 1 & 0 \\ 0 & 1 & 0 & 0 \\ 1 & 0 & 0 & 0 \end{bmatrix} \quad J_2 = \begin{bmatrix} 0 & -1 \\ 1 & 0 \end{bmatrix},$$

with $$\tilde{h}_{8k-7} = \begin{cases} vec([(H_k^R)^T, (H_k^I)^T]^T), & \text{for } quasi\text{-}orthogonal, \\ vec([(H_k^R)^T, 0_{N\times 2}, (H_k^I)^T, 0_{N\times 2}]^T), & \text{for } Alamouti. \end{cases} \quad (9)$$

Finally, for a single transmit antenna BS, defining $\tilde{C}_i = (I_N \otimes C_i)$, we have that $$\tilde{H}_k = [\tilde{h}_{8k-7}, \ldots, \tilde{h}_{8k}] \quad (10)$$
$$= [\tilde{C}_1 \tilde{h}_{8k-7}, -\tilde{C}_2 \tilde{h}_{8k-7}, \tilde{C}_3 \tilde{h}_{8k-7}, -\tilde{C}_4 \tilde{h}_{8k-7}, \tilde{C}_5 \tilde{h}_{8k-7},$$
$$\tilde{C}_6 \tilde{h}_{8k-7}, \tilde{C}_7 \tilde{h}_{8k-7}, \tilde{C}_8 \tilde{h}_{8k-7}]$$

and $$\tilde{h}_{8k-7} = vec([(H_k^R)^T, 0_{N\times 3}, (H_k^I)^T, 0_{N\times 3}]^T).$$

Further, we let $\tilde{W} \triangleq diag\{w_1, \ldots, w_K\} \otimes I_8$ and define $$\tilde{H}_{\bar{k}} \triangleq [\tilde{H}_{k+1}, \ldots, \tilde{H}_K], \quad (11)$$

$$\tilde{W}_{\bar{k}} \triangleq diag\{w_{k+1}, \ldots, w_K\} \otimes I_8. \quad (12)$$

2.2. Group Decoders

We consider the decoding of a frame received over T=4J, J≧1 consecutive symbol intervals, where over a block of 4 consecutive symbol intervals (or four consecutive tones in an OFDMA system) we obtain a model of the form in (6). We first consider the group MMSE decision-feedback decoder (GM-DFD), where the user decodes and cancels the signals of as many interfering BSs as necessary before decoding the desired signal. We then consider the group MMSE decoder (GMD) where the user only decodes the desired BS after suppressing the signals of all the interfering BSs.

2.2.1. Group MMSE Decision-Feedback Decoder (GM-DFD)

For ease of exposition, we assume that BS k is the desired one and that the BSs are decoded in the increasing order of their indices, i.e., BS 1 is decoded first, BS 2 is decoded second and so on. Note that no attempt is made to decode the signals of BSs k+1 to K.

The soft statistics for the first BS over 4 consecutive symbol intervals, denoted by $\tilde{r}_1$, are obtained as, $$\tilde{r}_1 = \tilde{F}_1 \tilde{y} = \tilde{F}_1 \tilde{H}_1 \tilde{x}_1 + \tilde{u}_1, \quad (13)$$

where $\tilde{F}_1$ denotes the MMSE filter for BS 1 and is given by, $\tilde{F}_1 = \hat{H}_1^T (\sigma^2 I + \hat{H}_{\bar{1}} \hat{W}_{\bar{1}} \hat{H}_{\bar{1}}^T)^{-1}$ and $\tilde{u}_1 = \tilde{F}_1 \tilde{H}_{\bar{1}} \tilde{x}_{\bar{1}} + \tilde{F}_1 \tilde{v}_1$ and note that
$$\hat{\Sigma}_1 \triangleq E[\tilde{u}_1 \tilde{u}_1^T] = \tilde{F}_1 \tilde{H}_1 = \hat{H}_1^T (\sigma^2 I + \hat{H}_{\bar{1}} \hat{W}_{\bar{1}} \hat{H}_{\bar{1}}^T)^{-1} \hat{H}_1. \quad (14)$$

To decode BS 1, $\tilde{u}_1$ is assumed to be a colored Gaussian noise vector with the covariance in (14). Under this assumption, in the case when no outer code is employed by BS 1, the decoder obtains a hard decision $\tilde{x}_1$, using the maximum-likelihood (ML) rule over the model in (13). On the other hand, if an outer code is employed by BS 1 soft-outputs for each coded bit in $\tilde{x}_1$ are obtained using the soft-output MIMO demodulator over the model in (13), which are then fed to a decoder. The decoded codeword is re-encoded and modulated to obtain the decision vectors $\{\hat{x}_1\}$ over the frame of duration 4J symbol intervals. In either case, the decision vectors $\{\hat{x}_1\}$ are fed back before decoding the subsequent BSs. In particular, the soft statistics for the desired $k^{th}$ BS, are obtained as, $$\tilde{r}_k = \tilde{F}_k \left( \tilde{y} - \sum_{j=1}^{k-1} \tilde{H}_j \hat{x}_j \right), \quad (15)$$

where $\tilde{F}_k$ denotes the MMSE filter for BS k and is given by, $\tilde{F}_k = \hat{H}_k^T (\sigma^2 I + \hat{H}_{\bar{k}} \hat{W}_{\bar{k}} \hat{H}_{\bar{k}}^T)^{-1}$. The decoder for the BS k is restricted to be a function of $\{\tilde{r}_k\}$ and obtains the decisions $\{\hat{x}_k\}$ in a similar manner after assuming perfect feedback and assuming the additive noise plus interference to be Gaussian. Note that the choice of decoding BSs 1 to k−1 prior to BS k was arbitrary. In the sequel we will address the issue of choosing an appropriate ordered subset of interferers to decode prior to the desired signal.

2.2.2. Group MMSE Decoder (GMD)

We assume that BS 1 is the desired one so that only BS 1 is decoded after suppressing the interference from BSs 2 to K. The soft statistics for the desired BS are exactly $\tilde{r}_1$ given in (13). Note that the MMSE filter for BS 1 can be written as $\tilde{F}_1 = \hat{H}_1^T (\tilde{R}_{\bar{1}})^{-1}$ where $\tilde{R}_{\bar{1}} = \sigma^2 I + \hat{H}_{\bar{1}} \hat{W}_{\bar{1}} \hat{H}_{\bar{1}}^T$, denotes the covariance matrix of the noise plus interference. Thus to implement this decoder we only need estimates of the channel matrix corresponding to the desired signal and the covariance matrix. Also, the user need not be aware of the inner code employed by any of the interfering BSs. In this work we assume perfect estimation of the channel as well as the covariance matrices.

Inspecting the models in (13) and (15), we see that the complexity of implementing the ML detection (demodulation) for the $k^{th}$ BS (under the assumption of perfect feedback in case of GM-DFD) directly depends on the structure of the matrix $\tilde{F}_k \tilde{H}_k$. Ideally, the matrix $\tilde{F}_k \tilde{H}_k$ should be diagonal which results in a linear complexity and if most of the off-diagonal elements of $\tilde{F}_k \tilde{H}_k$ are zero, then the cost of implementing the detector (demodulator) is significantly reduced. Henceforth, for notational convenience we will absorb the matrix $\tilde{W}$ in the matrix $\tilde{H}$, i.e., we will denote the matrix $\tilde{H}\tilde{W}$ by $\tilde{H}$.

3. Decoupling Property

In this section we prove a property which results in significantly lower demodulation complexity. Note that the matrices defined in (8) have the following properties:

$$C_\ell^T = C_\ell \in \{1,3\}, \quad C_\ell^T = -C_\ell \in \{1,\ldots,8\} \setminus \{1,3\},$$
$$C_\ell^T = I, \forall C_\ell^T. \tag{16}$$

In addition they also satisfy the ones given in Table 1, shown below,

TABLE I

PROPERTIES OF $\{C_i\}$

|   | $C_1$ | $C_2$ | $C_3$ | $C_4$ | $C_5$ | $C_6$ | $C_7$ | $C_8$ |
|---|---|---|---|---|---|---|---|---|
| $C_1^T$ | $C_1$ | $C_2$ | $C_3$ | $C_4$ | $C_5$ | $C_6$ | $C_7$ | $C_8$ |
| $C_2^T$ | $-C_2$ | $C_1$ | $-C_4$ | $C_3$ | $C_6$ | $-C_5$ | $C_8$ | $-C_7$ |
| $C_3^T$ | $C_3$ | $C_4$ | $C_1$ | $C_2$ | $C_7$ | $C_8$ | $C_5$ | $C_6$ |
| $C_4^T$ | $-C_4$ | $C_3$ | $-C_2$ | $C_1$ | $C_8$ | $-C_7$ | $C_6$ | $-C_5$ |
| $C_5^T$ | $-C_5$ | $-C_6$ | $-C_7$ | $-C_8$ | $C_1$ | $C_2$ | $C_3$ | $C_4$ |
| $C_6^T$ | $-C_6$ | $C_5$ | $-C_8$ | $C_7$ | $-C_2$ | $C_1$ | $-C_4$ | $C_3$ |
| $C_7^T$ | $-C_7$ | $-C_8$ | $-C_5$ | $-C_6$ | $C_3$ | $C_4$ | $C_1$ | $C_2$ |
| $C_8^T$ | $-C_8$ | $C_7$ | $-C_6$ | $C_5$ | $-C_4$ | $C_3$ | $-C_2$ | $C_1$ | where the matrix in the $(i,j)^{th}$ position is obtained as the result of $C_i^T C_j$. Thus, the set of matrices $\cup_{i=1}^8 \{\pm C_i\}$ is closed under matrix multiplication and the transpose operation. We offer the following theorem.

Theorem 1. Consider the decoding of the $k^{th}$ BS. We have that $$\tilde{H}_k^T (\sigma^2 I + \tilde{H}_{\bar{k}} \tilde{H}_{\bar{k}}^T)^{-1} \tilde{H}_k = \alpha_k C_1 + \beta_k C_3, \tag{17}$$

for some real-valued scalars $\alpha_k, \beta_k$. Note that $\alpha_k, \beta_k$ depend on $\tilde{H}_k$ and $\tilde{H}_{\bar{k}}$ but for notational convenience we do not explicitly indicate the dependence.

Proof. To prove the theorem, without loss of generality we will only consider decoding of the first BS. We first note that $$\sigma^2 I + \tilde{H}_T \tilde{H}_T^T = \sum_{i=1}^{8} (I_N \otimes C_i) \tilde{A} (I_N \otimes C_i^T), \tag{18}$$

where $\tilde{A} \triangleq \sigma^2/8 I + \Sigma_{k=1}^K \tilde{h}_{8k-7} \tilde{h}_{8k-7}^T$. Let $\tilde{B} \triangleq (\sigma^2 I + \tilde{H}_T \tilde{H}_T^T)^{-1}$ and note that $\tilde{B} > 0$. Using the properties of the matrices $\{C_i\}$ in (16) and Table 1, it is readily verified that $$(I_N \otimes C_i) \tilde{B} (I_N \otimes C_i^T) =$$
$$\left( (I_N \otimes C_i) \left( \sum_{i=1}^{8} (I_N \otimes C_i) \tilde{A} (I_N \otimes C_i^T) \right) (I_N \otimes C_i^T) \right)^{-1} = \tilde{B}.$$

As a consequence we can expand $\tilde{B}$ as $$\tilde{B} = \sum_{i=1}^{8} (I_N \otimes C_i)(\tilde{B}/8)(I_N \otimes C_i^T). \tag{19}$$

Next, invoking the properties of the matrices $\{C_i\}$ and using the fact that $\tilde{B} = \tilde{B}^T$, it can be seen that the matrix $(I_N \otimes C_k^T)(\Sigma_{i=1}^8 (I_N \otimes C_i)(\tilde{B}/8)(I_N \otimes C_j))$, where $1 \leq k, j \leq 8$ is identical to $\tilde{B}$ when k=j, is identical when (k,j) or (j,k)$\in$ $\{(1,3),(2,4),(5,7),(6,8)\}$ and is skew symmetric otherwise. The desired property in (17) directly follows from these facts.

Note that Theorem 1 guarantees the quasi-orthogonality property even after interference suppression. In particular, the important point which can be inferred from Theorem 1 is that the joint detection (demodulation) of four complex QAM symbols (or eight PAM symbols) is split into four smaller joint detection (demodulation) problems involving a pair of PAM symbols each. Thus with four M-QAM complex symbols the complexity is reduced from $\mathscr{O}(M^4)$ to $\mathscr{O}(M)$. Furthermore, specializing Theorem 1 to the case when the desired BS (say BS k) employs the quasi-orthogonal design and there are no interferers, we see that $$\tilde{H}_k^T \tilde{H}_k = \alpha_k C_1 + \beta_k C_3. \tag{20}$$

(20) implies that maximum likelihood decoding complexity of the quasi-orthogonal design is $\mathscr{O}(M)$ instead of the more pessimistic $\mathscr{O}(M^2)$ claimed by the original contribution. We note that a different quasi-orthogonal design referred to as the minimum decoding complexity quasi-orthogonal design, was proposed for a point-to-point MIMO system in the prior art, which was shown to have an ML decoding complexity of $\mathscr{O}(M)$.

Finally, it can be inferred from the sequel that $\beta_k = 0$ in (17), when no BS in $\{k, k+1, \ldots, K\}$ employs the quasi orthogonal design.

4. Efficient Inverse Computation

In this section we utilize the structure of the covariance matrix $\tilde{R} \triangleq \sigma^2 I + \tilde{H}\tilde{H}^T$ to efficiently compute its inverse. Consequently, the complexity involved in computing the MMSE filters is significantly reduced. Let $\tilde{S} = \tilde{R}^{-1}$. From (18) and (19), it follows that we can expand both $\tilde{R}, \tilde{S}$ as $$\tilde{R} = \begin{bmatrix} \sum_{i=1}^{8} C_i P_{11} C_i^T & \cdots & \sum_{i=1}^{8} C_i P_{1N} C_i^T \\ \vdots & \cdots & \vdots \\ \sum_{i=1}^{8} C_i P_{N1} C_i^T & \cdots & \sum_{i=1}^{8} C_i P_{NN} C_i^T \end{bmatrix} \tag{21}$$

$$\tilde{S} = \begin{bmatrix} \sum_{i=1}^{8} C_i P_{11} C_i^T & \cdots & \sum_{i=1}^{8} C_i P_{1N} C_i^T \\ \vdots & \cdots & \vdots \\ \sum_{i=1}^{8} C_i P_{N1} C_i^T & \cdots & \sum_{i=1}^{8} C_i Q_{NN} C_i^T \end{bmatrix},$$

where $\{P_{ij}, Q_{ij}\}_{i,j=1}^{N}$ are 8×8 matrices such that $$P_{ji}=P_{ij}^T, Q_{ji}=Q_{ij}^T, 1\leq i,j\leq N. \quad (22)$$

The inverse $\tilde{S}$ can be computed recursively starting from the bottom-right sub-matrix of $\tilde{R}$ using the following inverse formula for block partitioned matrices $$\begin{bmatrix} E & F \\ G & H \end{bmatrix}^{-1} = \quad (23)$$

$$\begin{bmatrix} (E-FH^{-1}G)^{-1} & -(E-FH^{-1}G)^{-1}FH^{-1} \\ -H^{-1}G(E-FH^{-1}G)^{-1} & H^{-1}+H^{-1}G(E-FH^{-1}G)^{-1}FH^{-1} \end{bmatrix}$$

The following properties ensure that the computations involved in determining $\tilde{S}$ are dramatically reduced.

First, note that the 8×8 sub-matrices in (21) belong to the set of matrices $$\left\{ \mathcal{P} \triangleq \sum_{i=1}^{8} C_i A C_i^T : A \in IR^{8\times 8} \right\}. \quad (24)$$

It is evident that $\mathcal{P}$ is closed under the transpose operation. Utilizing the structure of the matrices $\{C_i\}$ in (8), after some algebra it can be shown that the set $\mathcal{P}$ can also be written as $$\mathcal{P} \triangleq \left\{ \sum_{i=1}^{8} b_i S_i : [b_1, \ldots, b_8]^T \in IR^8 \right\}, \quad (25)$$

where $S_1=I_8$, $S_5=J_2\otimes I_4$, $S_3=C_3$ and $$S_2 = \begin{bmatrix} 1 & 0 \\ 0 & -1 \end{bmatrix} \otimes \begin{bmatrix} 0 & 1 & 0 & 0 \\ -1 & 0 & 0 & 0 \\ 0 & 0 & 0 & 1 \\ 0 & 0 & -1 & 0 \end{bmatrix} \quad (26)$$

$$S_4 = \begin{bmatrix} 1 & 0 \\ 0 & -1 \end{bmatrix} \otimes \begin{bmatrix} 0 & 0 & 0 & 1 \\ 0 & 0 & -1 & 0 \\ 0 & 1 & 0 & 0 \\ -1 & 0 & 0 & 0 \end{bmatrix}$$

$$S_6 = \begin{bmatrix} 0 & 1 \\ 1 & 0 \end{bmatrix} \otimes \begin{bmatrix} 0 & -1 & 0 & 0 \\ 1 & 0 & 0 & 0 \\ 0 & 0 & 0 & -1 \\ 0 & 0 & 1 & 0 \end{bmatrix}$$

$$S_7 = J_2 \otimes \begin{bmatrix} 0 & 0 & 1 & 0 \\ 0 & 0 & 0 & 1 \\ 1 & 0 & 0 & 0 \\ 0 & 1 & 0 & 0 \end{bmatrix} S_8 = \begin{bmatrix} 0 & 1 \\ 1 & 0 \end{bmatrix} \otimes \begin{bmatrix} 0 & 0 & 0 & 1 \\ 0 & 0 & -1 & 0 \\ 0 & 1 & 0 & 0 \\ -1 & 0 & 0 & 0 \end{bmatrix}.$$

It is readily seen that the set $\mathcal{P}$ in (25) is a matrix group under matrix addition and note that any matrix $B\in\mathcal{P}$ is parametrized by eight scalars. The matrices $\{S_i\}$ have the following properties.

$$C_\ell^T = C_\ell^T, \ell\in\{1,3\}, C_\ell^T = C_\ell^T, \ell\in\{1,\ldots,8\}\setminus\{1,3\},$$
$$C_\ell^T = \forall C_\ell^T \quad (27)$$

in addition to the ones given in Table II, shown below.

TABLE II

PROPERTIES OF $\{S_i\}$

|  | $S_1$ | $S_2$ | $S_3$ | $S_4$ | $S_5$ | $S_6$ | $S_7$ | $S_8$ |
| --- | --- | --- | --- | --- | --- | --- | --- | --- |
| $S_1^T$ | $S_1$ | $S_2$ | $S_3$ | $S_4$ | $S_5$ | $S_6$ | $S_7$ | $S_8$ |
| $S_2^T$ | $-S_2$ | $S_1$ | $-S_4$ | $S_3$ | $-S_6$ | $S_5$ | $S_8$ | $-S_7$ |
| $S_3^T$ | $S_3$ | $S_4$ | $S_1$ | $S_2$ | $S_7$ | $-S_8$ | $S_5$ | $-S_6$ |
| $S_4^T$ | $-S_4$ | $S_3$ | $-S_2$ | $S_1$ | $S_8$ | $S_7$ | $-S_6$ | $-S_5$ |
| $S_5^T$ | $-S_5$ | $S_6$ | $-S_7$ | $-S_8$ | $S_1$ | $-S_2$ | $S_3$ | $S_4$ |
| $S_6^T$ | $-S_6$ | $-S_5$ | $S_8$ | $-S_7$ | $S_2$ | $S_1$ | $S_4$ | $-S_3$ |
| $S_7^T$ | $-S_7$ | $-S_8$ | $-S_5$ | $S_6$ | $S_3$ | $-S_4$ | $S_1$ | $S_2$ |
| $S_8^T$ | $-S_8$ | $S_7$ | $S_6$ | $S_5$ | $-S_4$ | $-S_3$ | $-S_2$ | $S_1$ |

Using these properties it can be verified that the set $\{\pm S_i\}_{i=1}^{8}$ is closed under matrix multiplication and the transpose operation. The following lemma provides useful properties of the set $\mathcal{P}$.

Lemma 1.

$$A, B \in \mathcal{P} \Rightarrow AB \in \mathcal{P} \quad (28)$$

$$A = A^T \in \mathcal{P} \Leftrightarrow A = a_1 I_8 + a_2 S_3 = a_1 I_8 + a_2 C_3 \quad (29)$$

$$A = a_1 I_8 + a_2 S_3 \,\&\, |A| \neq 0 \Rightarrow A^{-1} = \frac{a_1}{a_1^2 - a_2^2} I_8 - \frac{a_2}{a_1^2 - a_2^2} S_3 \quad (30)$$

for some scalars $\alpha_1, \alpha_2$ and $$\sum_{i=1}^{8} C_i B C_i^T = b_1 I_8 + b_2 S_3 = b_1 I_8 + b_2 C_3, \forall B = B^T \in IR^{8\times 8} \quad (31)$$

$$Q \in \mathcal{P} \Rightarrow QQ^T = q_1 I_8 + q_2 C_3 \quad (32)$$

for some scalars $b_1, b_2, q_1, q_2$.

Proof. The facts in (28) and (29) follow directly by using the alternate form of $\mathcal{P}$ in (25) along with the properties of $\{S_i\}$. (30) follows after some simple algebra whereas (31) follows from (29) upon using the definition of $\mathcal{P}$ in (24). Finally (32) follows from (28) and (29) after recalling that the set $\mathcal{P}$ is closed under the transpose operation.

Thus for any $A, B \in \mathcal{P}$, the entire 8×8 matrix AB can be determined by only computing any one of its rows (or columns). The set $\mathcal{P}$ is not a matrix group since it contains singular matrices. However the set of all nonsingular matrices in $\mathcal{P}$ forms a matrix group as shown by the following lemma.

Lemma 2. If $A \in \mathcal{P}$ such that $|A| \neq 0$ then $A^{-1} \in \mathcal{P}$. The set of all non-singular matrices in $\mathcal{P}$, denoted by $\hat{\mathcal{P}}$, forms a matrix group under matrix multiplication and is given by $$\hat{\mathcal{P}} = \left\{ \sum_{i=1}^{8} b_i S_i : [b_1, \ldots, b_8]^T \in IR^8 \,\&\, \sum_{i=1}^{8} b_i^2 \neq \right. \quad (33)$$

$$\left. \pm 2(b_1 b_3 + b_2 b_4 + b_5 b_7 - b_6 b_8) \right\}$$

Proof. Consider any non-singular $A \in \mathcal{P}$ so that $A^{-1}$ exists. We can use the definition of $\mathcal{P}$ in (24) to expand A as $\sum_{j=1}^{8} C_j Q C_j^T$ for some $Q \in IR^{8\times 8}$. Consequently $A^{-1} = (\sum_{j=1}^{8} C_j Q C_j^T)^{-1}$. Next, as done in the proof of Theorem 1, using the properties of $\{C_i\}$ we can show that $C_iA^{-1}C_i^T=(C_i(\Sigma_{j=1}^8 C_jQC_j^T)C_i^T)^{-1}=A^{-1}$. Thus, we have that $$A^{-1} = \sum_{j=1}^{8} C_J(A^{-1}/8)C_j^T, \tag{34}$$

so that $A^{-1} \in \hat{\mathcal{P}}$. Next, using the alternate form of $\hat{\mathcal{P}}$ in (25) we must have that $A = \Sigma_{i=1}^8 \alpha_i S_i$, for some $\{\alpha_i\}$ Since the non-singular $A \in \hat{\mathcal{P}}$ we must have that $AA^T \in \hat{\mathcal{P}}$ and note that $$|A| \neq 0 \Leftrightarrow |AA^T| > 0. \tag{35}$$

Invoking the property in (32), after some algebra we see that $$AA^T = \sum_{i=1}^{8} a_i^2 I_8 + 2(a_1a_3 + a_2a_4 + a_5a_7 - a_6a_8)C_3. \tag{36}$$

Then it can be verified that $$|AA^T| = \left(\left(\sum_{i=1}^{8} a_i^2\right)^2 - 4(a_1a_3 + a_2a_4 + a_5a_7 - a_6a_8)^2\right)^4. \tag{37}$$

From (35) and (37), we see that the set $\widehat{\mathcal{P}}$ is precisely the set of all non-singular matrices in $\mathcal{P}$. Since this set includes the identity matrix, is closed under matrix multiplication and inversion, it is a matrix group under matrix multiplication.

Lemma 2 is helpful in computing the inverses of the principal sub-matrices of $\tilde{R}$. Note that since $\tilde{R} \succ 0$, all its principal sub-matrices are also positive-definite and hence non-singular. Then, to compute the inverse of any $A \in \widehat{\mathcal{P}}$, we can use Lemma 2 to conclude that $A^{-1} \in \widehat{\mathcal{P}}$ so that we need to determine only the eight scalars which parametrize $A^{-1}$. As mentioned before, in this work we assume that a perfect estimate of the covariance matrix $\tilde{R}$ is available. In practice the covariance matrix $\tilde{R}$ must be estimated from the received samples. We have observed that the Ledoit and Wolf's (LW) estimator [10] works well in practice. For completeness we provide the LW estimator. Let $\{\tilde{y}_n\}_{n=1}^S$ be the S vectors which are obtained from samples received over 4S consecutive symbol intervals over which the effective channel matrix $\tilde{H}$ in (6) is constant. These samples could also be received over consecutive tones and symbols in an OFDMA system. Then the LW estimate $\hat{\tilde{R}}$ is given by $$\hat{\tilde{R}} = (1-\rho)\hat{Q} + \mu\rho I, \tag{38}$$

where $$\hat{Q} = \frac{1}{S}\sum_{n=1}^{S} \tilde{y}_n\tilde{y}_n^T \text{ and}$$

$$\rho = \min\left\{\frac{\sum_{n=1}^{S}\|\tilde{y}_n\tilde{y}_n^T - \hat{Q}\|_F^2}{S^2\|\hat{Q} - \mu I\|_F^2}, 1\right\} \tag{39}$$

and $\mu = \frac{tr(\hat{Q})}{8N}$.

5. GM-DFD: Decoding Order

It is well known that the performance of decision feedback decoders is strongly dependent on the order of decoding. Here however, we are only concerned with the error probability obtained for the signal of the desired (serving) BS. Note that the GM-DFD results in identical performance for the desired BS for any two decoding orders where the ordered sets of BSs decoded prior to the desired one, respectively, are identical. Using this observation, we see that the optimal albeit brute-force method to decode the signal of the desired BS using the GM-DFD would be to sequentially examine $$\sum_{i=0}^{K-1} i!\binom{K-1}{i}$$

possible decoding orders, where the ordered sets of BSs decoded prior to the desired one are distinct for any two decoding orders, and pick the first one where the signal of desired BS is correctly decoded, which in practice can be determined via a cyclic redundancy check (CRC). Although the optimal method does not examine all K! possible decoding orders, it can be prohibitively complex. We propose an process which determines the BSs (along with the corresponding decoding order) that must be decoded before the desired one. The remaining BSs are not decoded.

The challenge in designing such a process is that while canceling a correctly decoded interferer clearly aids the decoding of the desired signal, the subtraction of even one erroneously decoded signal can result in a decoding error for the desired signal. Before providing the process we need to establish some notation. We let $\mathcal{K} = \{1, \ldots, K\}$ denote the set of BSs and let k denote the index of the desired BS. Let $R_j$, $1 \leq j \leq K$ denote the rate (in bits per channel use) at which the BS j transmits. Also, we let $\pi$ denote any ordered subset of K having k as its last element. For a given $\pi$, we let $\pi(1)$ denote its first element, which is also the index of the BS decoded first by the GM-DFD, $\pi(2)$ denote its second element, which is also the index of the BS decoded second by the GM-DFD and so on. Finally let $|\pi|$ denote the cardinality of $\pi$ and let Q denote the set of all possible such $\pi$.

Let us define $m(\tilde{H},j,S)$ to be a metric whose value is proportional to the chance of successful decoding of BS j in the presence of interference from BSs in the set S. A large value of the metric implies a high chance of successfully decoding BS j. Further, we adopt the convention that $m(\tilde{H},\phi,S)=\infty, \forall S$, since no error is possible in decoding the empty set. Define $\tilde{H}_S = [\tilde{H}_j]_{j \in S}$. Let $I(\tilde{H},j,S)$ denote an achievable rate (in bits per channel use) obtained post MMSE filtering for BS j in the presence of interference from BSs in the set S and note that $$I(\tilde{H}, j, S) = \frac{1}{2}\log\left|I_8 + \tilde{H}_j^T(\sigma^2 I + \tilde{H}_S\tilde{H}_S^T)^{-1}\tilde{H}_j\right| \tag{40}$$
$$= 2\log((1+\alpha_{j,S})^2 - \beta_{j,S}^2),$$

where the second equality follows upon using (17). In this work we suggest the following three examples for $m(\tilde{H},j,S)$ $$m(\tilde{H}, j, S) = I(\tilde{H}, j, S) - R_j, \tag{41}$$

$$m(\tilde{H}, j, S) = I(\tilde{H}, j, S)/R_j, \tag{42}$$

and

-continued $$m(\tilde{H}, j, S) = \max_{\rho \in [0,1]} \rho \left( \frac{1}{2} \log \left| I_8 + \frac{1}{1+\rho} \tilde{H}_j^T (\sigma^2 + \tilde{H}_S \tilde{H}_S^T)^{-1} \tilde{H}_j \right| - R_j \right) \quad (43)$$

$$= \max_{\rho \in [0,1]} \rho \left( 2 \log \left( \left(1 + \frac{\alpha_{j,S}}{1+\rho}\right)^2 - \frac{\beta_{j,S}^2}{(1+\rho)^2} \right) - R_j \right).$$

Note that the metric in (43) is the Gaussian random coding error exponent obtained after assuming BSs in the set S to be Gaussian interferers. All three metrics are applicable to general non-symmetric systems where the BSs may transmit at different rates. It can be readily verified that all the three metrics given above also satisfy the following simple fact $$m(\tilde{H}, j, S) \geq m(\tilde{H}, j, \mathcal{R}), \forall S \subseteq \mathcal{R} \subseteq K. \quad (44)$$

Now, for a given $\pi \in Q$, the metric $m(H, k, \mathcal{K} \setminus \cup_{j=1}^{|\pi|} \pi(j))$ indicates the decoding reliability of the desired signal assuming perfect feedback from previously decoded signals, whereas $\min_{1 \leq j \leq |\pi|-1} m(\tilde{H}, \pi(j), \mathcal{K} \setminus \cup_{i=1}^{j} \pi(i))$ can be used to measure the quality of the fed-back decisions. Thus a sensible metric to select $\pi$ is $$f(H, \pi) \triangleq \min_{1 \leq j \leq |\pi|} m\left( \tilde{H}, \pi(j), \mathcal{K} \setminus \bigcup_{i=1}^{j} \pi(i) \right). \quad (45)$$

We are now ready to present our process.
1. Initialize: $S = \{1, \ldots, K\}$ and $\hat{\pi} = \phi$.
2. Among all BS indices $j \in S$, select the one having the highest value of the metric $m(\tilde{H}, j, S \setminus j)$ and denote it by $\hat{j}$.
3. Update $S = S \setminus \hat{j}$ and $\hat{\pi} = \{\hat{\pi}, \hat{j}\}$.
4. If $\hat{j} = k$ then stop else go to Step 2.

The proposed greedy process is optimal in the following sense.

Theorem 2. The process has the following optimality.

$$\hat{\pi} = \operatorname*{argmax}_{\pi \in Q} f(\tilde{H}, \pi). \quad (46)$$

Proof. Let $\pi^{(i)}$ be any other valid ordered partition in Q such that its first i elements are identical to those of $\hat{\pi}$. Construct another ordered partition $\hat{\pi}^{(i+1)}$ as follows:

$$\pi^{(i+1)}(j) = \pi^{(i)}(j) = \hat{\pi}(j), 1 \leq j \leq i,)$$

$$\pi^{(i+1)}(i+1) = \hat{\pi}(i+1),$$

$$\pi^{(i+1)}(j+1) = \pi^{(i)}(j)\backslash \hat{\pi}(i+1), i+1 \leq j \leq |\pi^{(i)}| \& \hat{\pi}(i+1) \neq k. \quad (47)$$

Note that $\pi^{(i+1)} \in Q$. Now, to prove optimality it is enough to show that $$f(\tilde{H}, \pi^{(i+1)}) \geq f(\tilde{H}, \pi^{(i)}). \quad (48)$$

To show (48) we first note that $$m(\tilde{H}, \pi^{(i+1)}(j), K \setminus \cup_{q=1}^{j} \pi^{(i+1)}(q)) = m(\tilde{H}, \pi^{(i)}(j), K \setminus \cup_{q=1}^{j} \pi^{(i)}(q)), 1 \leq j \leq i. \quad (49)$$

Since the greedy process selects the element (BS) with the highest metric at any stage, we have that $$m(\tilde{H}, \pi^{(i+1)}(i+1), \setminus \cup_{q=1}^{i+1} \pi^{(i+1)}(q)) \geq m(\tilde{H}, \pi^{(i)}(i+1), \setminus \cup_{q=1}^{i+1} \pi^{(i)}(q)). \quad (50)$$

If $\hat{\pi}(i+1)$ equals k then (49) and (50) prove the theorem, else using (85) we see that $$m(\tilde{H}, \pi^{(i+1)}(j+1), \setminus \cup_{q=1}^{j+1} \pi^{(i)}(q)) \geq m(\tilde{H}, \pi^{(i)}(j), \setminus \cup_{q=1}^{j} \pi^{(i)}(q)), i+1 \leq j \leq |\pi^{(i)}|. \quad (51)$$

From (51), (50) and (49) we have the desired result.

The following remarks are now in order.

The metrics in (41)-to-(43) are computed assuming Gaussian input alphabet and Gaussian interference. We can exploit the available modulation information by computing these metrics for the exact alphabets (constellations) used by all BSs but this makes the metric computation quite involved. We can also compute the metric $m(\tilde{H},j,)$ by assuming the BSs in the set of interferers S to be Gaussian interferers but using the actual alphabet for the BS j, which results in a simpler metric computation. In this work, we use the first (and simplest) option by computing the metrics as in (82)-to-(84). Moreover, the resulting decoding orders are shown in the sequel to perform quite well with finite alphabets and practical outer codes.

A simple way to achieve the performance of the optimal GM-DFD with a lower average complexity, is to first examine the decoding order suggested by the greedy process and only in the case the desired BS is decoded erroneously, to sequentially examine the remaining $$\sum_{i=0}^{K-1} i! \binom{K-1}{i} - 1$$

decoding orders.

Note that when $f(\tilde{H},\hat{\pi})$—where $\hat{\pi}$ is the order determined by the greedy rule—is negative, less than 1 and equal to 0 when $m(\tilde{H},j,S)$ is computed according to (41), (42) and (43), respectively, we can infer that with high probability at least one BS will be decoded in error. In particular, suppose we use the metric in (41). Then an error will occur (with high probability) for the desired BS k even after perfect cancellation of the previous BSs if $m(\tilde{H},k, \mathcal{K} \setminus \cup_{j=1}^{|\hat{\pi}|} \hat{\pi}(j)) < 0$. On the other hand, when $m(\tilde{H},k, \mathcal{K} \setminus \cup_{j=1}^{|\hat{\pi}|} \hat{\pi}(j)) > 0$ but $\min_{1 \leq j \leq |\hat{\pi}|-1} m(\tilde{H},\hat{\pi}(j), \mathcal{K} \setminus \cup_{i=1}^{j} \hat{\pi}(i)) < 0$, we can infer that the decoding of the desired BS will be affected (with high probability) by error propagation from BSs decoded previously. Unfortunately, it is hard to capture the effect of error propagation precisely and we have observed that the assumption that error propagation always leads to a decoding error for the desired BS is quite pessimistic.

6. Special Cases

In this section a lower complexity GMD is obtained at the cost of potential performance degradation by considering only two consecutive symbol intervals when designing the group MMSE filter. Further, when no interfering BS employs the quasi-orthogonal design no loss of optimality is incurred. Similarly, when none of the BSs employ the quasi-orthogonal design, without loss of optimality we can design the GM-DFD by considering only two consecutive symbol intervals.

In this case, the 2×N channel output received over two consecutive symbol intervals can be written as (1). As before, the transmitted matrix X can be partitioned as $X = [X_1, \ldots, X_K]$ but where $$X_k = \begin{bmatrix} x_{k,1} & x_{k,2} \\ -x_{k,2}^\dagger & x_{k,1}^\dagger \end{bmatrix}, \quad (52)$$

when the $k^{th}$ BS employs the Alamouti design and $$X_k = [x_{k,1} \, x_{k,2}]^T, \quad (53)$$

when the $k^{th}$ BS has only one transmit antenna. Note that over two consecutive symbol intervals, an interfering BS employing the quasi-orthogonal design is equivalent to two dual transmit antenna BSs, each employing the Alamouti design. Then we can obtain a linear model of the form in (6), where $\tilde{x}=[\tilde{x}_1^T, \ldots, \tilde{x}_K^T]^T$ and $\tilde{x}_k=[x_{k,1}^R, x_{k,2}^R, x_{k,1}^1, x_{k,2}^1]^T$ with $\tilde{H}=[\tilde{H}_1, \ldots, \tilde{H}_K]=[\tilde{h}_1, \ldots, \tilde{h}_{4K}]$. The matrix $\tilde{H}_k$ corresponding to a BS employing the Alamouti design can be expanded as $$\tilde{H}_k = [\tilde{h}_{4k-3}, \ldots, \tilde{h}_{4k}] =$$
$$[\tilde{h}_{4k-3}, (I_N \otimes D_1)\tilde{h}_{4k-3}, (I_N \otimes D_2)\tilde{h}_{4k-3}, (I_N \otimes D_3)\tilde{h}_{4k-3}], \quad (54)$$

with $\tilde{h}_{4k-3}=\text{vec}([(H_k^R)^T, (H_k^1)^T]^T)$, whereas that corresponding to a single transmit antenna BS can be expanded as $$\tilde{H}_k = [\tilde{h}_{4k-3}, \ldots, \tilde{h}_{4k}] =$$
$$[\tilde{h}_{4k-3}, -(I_N \otimes D_1)\tilde{h}_{4k-3}, (I_N \otimes D_2)\tilde{h}_{4k-3}, (i_N \otimes d_3)\tilde{h}_{4k-3}], \quad (55)$$

with $\tilde{h}_{4k-3}=\text{vec}([(H_k^R)^T, 0_{N\times 1}, (H_k^1)^T, 0_{N\times 1}]^T)$. The matrices $D_1, D_2, D_3$ are given by $$D_1 \triangleq \begin{bmatrix} 0 & 1 & 0 & 0 \\ -1 & 0 & 0 & 0 \\ 0 & 0 & 0 & 1 \\ 0 & 0 & -1 & 0 \end{bmatrix} \quad (56)$$

$$D_2 \triangleq \begin{bmatrix} 0 & 0 & -1 & 0 \\ 0 & 0 & 0 & 1 \\ 1 & 0 & 0 & 0 \\ 0 & -1 & 0 & 0 \end{bmatrix}$$

$$D_3 \triangleq \begin{bmatrix} 0 & 0 & 0 & -1 \\ 0 & 0 & -1 & 0 \\ 0 & 1 & 0 & 0 \\ 1 & 0 & 0 & 0 \end{bmatrix}.$$

Note that the matrices defined in (56) have the following properties:

$$C_\ell^T = C_\ell^T, \quad C_\ell^T = I, \quad 1 \leq C_\ell^T \leq 3$$

$$D_2^T D_1 = -D_3, \quad D_2^T D_3 = D_1, \quad D_1^T D_3 = -D_2. \quad (57)$$

Using the properties given in (57), we can prove the following theorem in a manner similar to that of Theorem 1. The proof is skipped for brevity.

Theorem 3. Consider the decoding of the $k^{th}$ BS. We have that $$\tilde{H}_k^T(\sigma^2 I + \tilde{H}_R \tilde{H}_R^T)^{-1}\tilde{H}_k = \alpha_k I_4. \quad (58)$$

Let $\tilde{U} \triangleq \sigma^2 I + \tilde{H}\tilde{H}^T$ denote a sample covariance matrix obtained by considering two consecutive symbol intervals. Define $_k=[2k-1, 2k, 4N+2k-1, 4N+2k]$, $1 \leq k \leq 2N$ and $e=[e_1, \ldots, e_{2N}]$ and let M denote the permutation matrix obtained by permuting the rows of $I_{8N}$ according to e. Then, it can be verified that the matrices in (7) and (10), corresponding to Alamouti and single antenna BSs (over four symbol intervals), are equal (up to a column permutation) to $M(I_2 \otimes \tilde{H}_k)$, where $\tilde{H}_k$ is given by (54) and (55), respectively. Consequently, the covariance matrix $\tilde{R}$ in (21) is equal to $M(I_2 \otimes \tilde{U})M^T$, when no quasi-orthogonal BSs are present, so that $\tilde{R}^{-1}=M(I_2 \otimes \tilde{U}^{-1})M^T$. Moreover, it can be shown that the decoupling property also holds when the desired BS employs the quasi-orthogonal design and the filters are designed by considering two consecutive symbol intervals. Note that designing the MMSE filter by considering two consecutive symbol intervals implicitly assumes that no quasi-orthogonal interferers are present, so the demodulation is done accordingly.

Next, we consider the efficient computation of the inverse $\tilde{V}=\tilde{U}^{-1}$. Letting $D_0=I_4$, analogous to (18) and (19), it can be shown that we can expand both $\tilde{U}, \tilde{V}$ as $$\tilde{U} = \begin{bmatrix} \sum_{i=0}^{3} D_i P_{11} D_i^T & \cdots & \sum_{i=0}^{3} D_i P_{1N} D_i^T \\ \vdots & \cdots & \vdots \\ \sum_{i=0}^{3} D_i P_{N1} D_i^T & \cdots & \sum_{i=0}^{3} D_i P_{NN} D_i^T \end{bmatrix}$$

$$\tilde{V} = \begin{bmatrix} \sum_{i=0}^{3} D_i Q_{11} D_i^T & \cdots & \sum_{i=0}^{3} D_i Q_{1N} D_i^T \\ \vdots & \cdots & \vdots \\ \sum_{i=0}^{3} D_i Q_{N1} D_i^T & \cdots & \sum_{i=0}^{3} D_i Q_{NN} D_i^T \end{bmatrix},$$

where $\{P_{ij}, Q_{ij}\}_{ij=1}^N$ are now $4\times 4$ matrices satisfying (22).

The inverse computation can be done recursively using the formula in (23). The following observations greatly reduce the number of computation involved.

First, utilizing the properties of the matrices $\{D_i\}$ in (57), we can show that the set $$\underline{Q} \triangleq \left\{\sum_{i=0}^{3} D_i A D_i^T : A \in IR^{4\times 4}\right\} = \left\{\sum_{i=0}^{3} b_i T_i : [b_0, \ldots, b_3] \in IR^4\right\}, \quad (59)$$

where $T_0 = I_4$, and $$T_1 = \begin{bmatrix} 0 & 1 & 0 & 0 \\ -1 & 0 & 0 & 0 \\ 0 & 0 & 0 & -1 \\ 0 & 0 & 1 & 0 \end{bmatrix}$$

$$T_2 = \begin{bmatrix} 0 & 0 & -1 & 0 \\ 0 & 0 & 0 & -1 \\ 1 & 0 & 0 & 0 \\ 0 & 1 & 0 & 0 \end{bmatrix}$$

$$T_3 = \begin{bmatrix} 0 & 0 & 0 & -1 \\ 0 & 0 & 1 & 0 \\ 0 & -1 & 0 & 0 \\ 1 & 0 & 0 & 0 \end{bmatrix}.$$

Thus $\underline{Q}$ is closed under the transpose operation and any matrix $B \in \underline{Q}$ is parametrized by four scalars. The matrices $\{T_i\}$ have the following properties:

$$C_\ell^T = C_\ell^T, \quad C_\ell^T = I, \quad 1 \leq C_\ell^T \leq 3$$

$$T_2^T T_1 = T_3, \quad T_2^T T_3 = -T_1, \quad T_1^T T_3 = T_2. \quad (60)$$

Using these properties it can be verified that the set $\{\pm T_i\}_{i=1}^8$ is closed under matrix multiplication and the transpose operation. The following two lemmas provide useful properties of the set $\underline{Q}$. The proofs are similar to those of the previous two lemmas and hence are skipped for brevity.

Lemma 3.

$$A, B \in \underline{Q} \Rightarrow AB \in \underline{Q}$$

$$A = A^T \in \underline{Q} \Rightarrow A = \alpha_1 I_4, \quad (61)$$

for some scalar $\alpha_1$ and $$\sum_{i=0}^{3} D_i B D_i^T = b_1 I_4 \; \forall \; B = B^T \in IR^{4\times 4} \quad (62)$$

$$Q \in \underline{Q} \Rightarrow QQ^T = q_1 I_4,$$

for some scalars $b_1, q_1$.

Thus for any $A, B \in Q$, the entire 4×4 matrix AB can be determined by only computing any one of its rows (or columns). Further, the set of all nonsingular matrices in Q forms a matrix group under matrix multiplication and is given by, $\tilde{Q} = \{\Sigma_{i=0}^{3} b_i T_i : [b_0, \ldots, b_3]^T \in IR^4 \backslash O\}$.

The invention employs improved filters, and provides for efficient design of the improved filters and using the decoupling property for SINR computation. Using improved filters results in higher rates from all sources compared to those obtained with conventional filters. The proposed inventive reception exploits the fact that the co-channel signals have a particular structure, in order to obtain significantly improved performance while ensuring low decoding complexity.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method for receiving data signals using a receiver equipped with multiple receive antennas in a wireless channel, on which all dominant transmitting sources transmit using inner codes from a particular set, comprising steps of:

estimating channel matrices seen from all the dominant transmitter sources in response to a pilot or preamble signal transmitted by each such source;

converting each of the estimated channel matrices into an effective channel matrix responsive to the inner code used by the corresponding dominant transmitting source;

collecting the signals received by the multiple receive antennas over consecutive intervals;

separating real and imaginary parts of the collected received signals and arranging them into a vector of real valued elements;

processing the dominant transmitter sources according to a pre-determined or specified order of decoding;

for each dominant transmitter source, assuming perfect cancellation of signals of preceding dominant transmitter sources;

computing an estimate of a covariance matrix of noise plus interference from remaining dominant transmitting sources not yet processed;

computing and feeding back a signal-to-noise-plus-interference-ratio (SINR) responsive to the effective channel matrix and the covariance matrix of the noise plus signals from the remaining dominant transmitter sources; and a decoupling property comprising a relationship $\tilde{H}_k^T \tilde{R}_{\bar{k}}^{-1} \tilde{H}_k = \alpha_k C_1 + \beta_k C_3$, where $\tilde{H}_k$ is the effective channel matrix corresponding to the said dominant transmitter source (with index k); $\tilde{R}_{\bar{k}}$ is an estimate of the said covariance matrix and $\tilde{R}_{\bar{k}}^{-1}$ is its inverse; $\tilde{H}_k^T$ is a matrix transpose of $\tilde{H}_k$; $\alpha_k, \beta_k$ are scarlars that depend on $\tilde{H}_k$ and $\tilde{R}_{\bar{k}}$, $C_1$ is the 8 by 8 identity matrix and $C_3$ is a particular fixed matrix equal to $$I_2 \otimes \begin{bmatrix} 0 & 0 & 1 & 0 \\ 0 & 0 & 0 & 1 \\ 1 & 0 & 0 & 0 \\ 0 & 1 & 0 & 0 \end{bmatrix}$$

where $I_2$ is the 2 by 2 identity matrix and $\otimes$ denotes the Kronecker product.

2. The method of claim 1, wherein the step of computing an estimate of the covariance matrix is responsive to the effective channel matrices of all the remaining dominant transmitter sources.

3. The method of claim 1, wherein the order of processing the dominant transmitter sources is determined according to weights or priorities assigned to the dominant transmitter sources, wherein the dominant transmitter source of highest priority is processed last, the second highest priority is processed second-to-last and so on, thereby the dominant transmitter source with the least priority is processed first and ties among transmitter sources' priorities can be broken arbitrarily.

4. The method of claim 1, wherein the dominant transmitter source can have distributed physical transmit antennas.

5. The method of claim 4, wherein said dominant transmitter source being formed by two or more transmitter sources which pool their transmit antennas and cooperatively transmit a signal to the destination receiver.

6. The method of claim 1, wherein only some of the dominant transmitter sources are of interest and the order of decoding only includes the indices corresponding to the dominant transmitter sources of interest with the SINRs being computed for and reported to only these sources of interest and the signals transmitted by sources not of interest being treated as interference.

7. The method of claim 2, wherein the covariance matrix of the noise plus signals transmitted by transmitter sources, not of interest, is estimated using said vectors as sample input vectors for a covariance matrix estimator.

8. The method of claim 3, wherein the step of estimating the covariance matrix also comprises a processing step such that the processed covariance matrix estimate has a property that all of its principal 8 by 8 sub-matrices belong to a matrix group that is closed under the matrix transpose operation and which is parameterized by 8 real valued scalars.

9. The method of claim 1, wherein the step of computing the SINR also includes computing and storing a filter for the transmitter source.

10. A method for receiving data signals using a receiver equipped with multiple receive antennas in a wireless channel, on which all dominant transmitting sources transmit using inner codes, comprising steps of:

estimating channel matrices seen from all dominant transmitting sources in response to a pilot or preamble signal transmitted by each such source;

converting each of the estimated channel matrices into an effective channel matrix responsive to the inner code used by the corresponding dominant transmitting source;

collecting the signals received by the multiple receive antennas over consecutive intervals;

separating real and imaginary parts of the collected received signals and arranging them into a vector of real valued elements;

processing the dominant transmitter sources according to the pre-determined order of decoding;

for each dominant transmitter source assuming perfect cancellation of signals of preceding dominant transmitter sources;

computing an estimate of a covariance matrix of a noise plus interference from remaining dominant transmitting sources not yet processed;

computing and feeding back a signal-to-noise-plus-interference-ratio (SINR) responsive to the effective channel matrix and the covariance matrix of the noise plus signals from the remaining dominant transmitter sources; and a decoupling property comprising the relationship $\tilde{H}_k^T \tilde{R}_{\bar{k}}^{-1} \tilde{H}_k = \alpha_k I_4$, where $\tilde{H}_k$ is the effective channel matrix corresponding to the said dominant transmitter source (with index k); $\tilde{R}_{\bar{k}}$ is an estimate of the said covariance matrix and $\tilde{R}_{\bar{k}}^{-1}$ is its inverse; $\tilde{H}_k^T$ is a matrix transpose of $\tilde{H}_k$; $\alpha_k$ is a scalar that depends on $\tilde{H}_k$ and $\tilde{R}_{\bar{k}}$; $I_4$ is the 4 by 4 identity matrix.

* * * * *